United States Patent [19]
Futagawa et al.

[11] Patent Number: 5,602,808
[45] Date of Patent: Feb. 11, 1997

[54] OBJECTIVE LENS DRIVING APPARATUS

[75] Inventors: Masayasu Futagawa; Keiji Sakai, both of Nara; Toshiyuki Tanaka, Moriguchi, all of Japan

[73] Assignee: Sharp Kabushiki Kaisha, Osaka, Japan

[21] Appl. No.: 315,349

[22] Filed: Sep. 30, 1994

[30] Foreign Application Priority Data

Oct. 1, 1993 [JP] Japan .................................. 5-247215

[51] Int. Cl.$^6$ ........................................................ G11B 7/09
[52] U.S. Cl. ................................. 369/44.14; 369/44.15; 359/813
[58] Field of Search ........................... 369/44.14, 44.15, 369/44.16, 44.21, 44.22; 259/813, 814, 823, 824

[56] References Cited

U.S. PATENT DOCUMENTS 5,164,936  11/1992  Kagami .......................... 369/44.15 X
5,228,017  7/1993  Matsuzaki et al. .............. 369/44.16 X

FOREIGN PATENT DOCUMENTS 432035  2/1992  Japan .
4245033  9/1992  Japan .

Primary Examiner—Thang V. Tran

[57] ABSTRACT

An objective lens driving apparatus includes a base, an objective lens for converging an optical beam on an optical disc while the optical disc is rotating, and a holding member for holding the objective lens. A first supporting mechanism elastically supports the holding member on the base in such a manner as to allow the holding member to be translated in a focusing direction which is substantially perpendicular to a surface of the optical disc and in a tracking direction which is substantially perpendicular to the focusing direction and parallel to a radial direction of the optical disc. A moving mechanism including a coil and a magnetic circuit translates the holding member in the focusing direction and the tracking direction by a driving force generated by the coil and the magnetic circuit. A second supporting mechanism visco-elastically supports the magnetic circuit on the base in such a manner as to translate the magnetic circuit in the focusing direction. The magnetic circuit is translated in an opposite direction to the translation direction of the holding member by a driving force acting oppositely to the driving force for translating the holding member in the focusing direction.

1 Claim, 14 Drawing Sheets

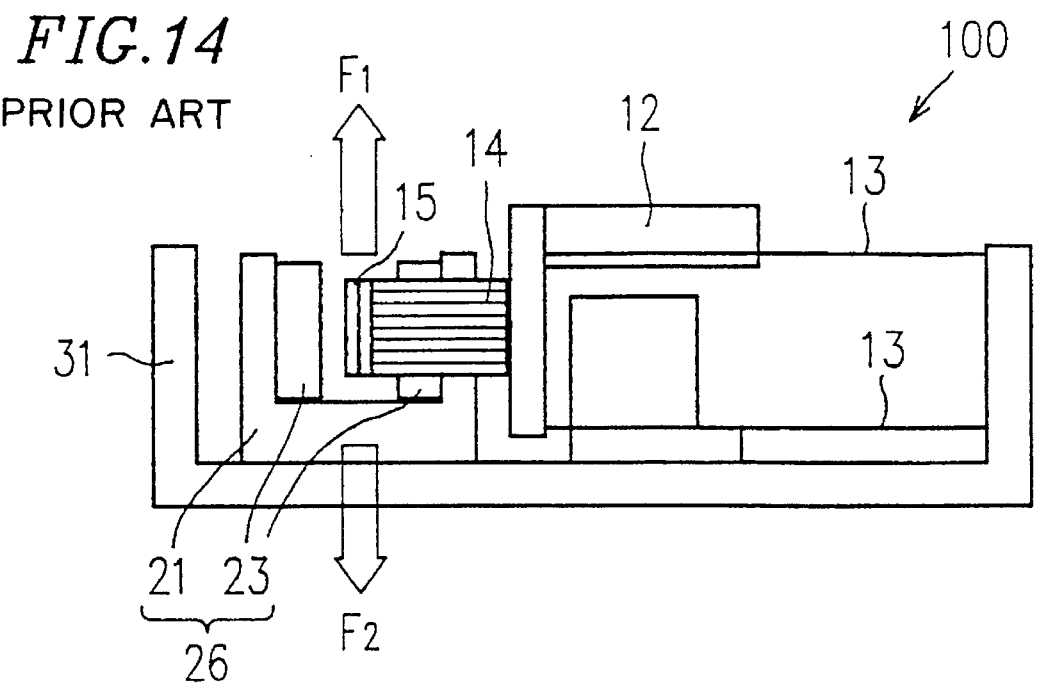

an optical disc or reproducing data from the optical disc while
the optical disc is rotating.

OBJECTIVE LENS DRIVING APPARATUS

BACKGROUND OF THE INVENTION

1. Field of the Invention

The present invention relates to an objective lens driving apparatus, and in particular to an objective lens driving apparatus for use in an optical disc drive for recording on an optical disc or reproducing data from the optical disc while the optical disc is rotating.

2. Description of the Related Art

The above-described type of optical disc drives are provided with an objective lens driving apparatus for moving an objective lens in a focusing direction and a tracking direction. In this specification, the focusing direction refers to the direction perpendicular to a surface of the optical disc, and the tracking direction refers to a direction horizontal and parallel to the radial direction of the optical disc.

Briefly referring to FIGS. 13 and 14, a conventional objective lens driving apparatus 100 will be described. FIG. 13 is a perspective view of the objective lens driving apparatus 100, and FIG. 14 is a side view of the objective lens driving apparatus 100. In this specification, the focusing direction and the tracking direction are set as shown in FIG. 13.

As is illustrated in FIGS. 13 and 14, an objective lens 11 is supported by an objective lens holder 12 in a state where the optical axis thereof is perpendicular to the surface of an optical disc (not shown). In such a state, the objective lens 11 converges an optical beam on the optical disc. The objective lens holder 12 is attached to a carriage 31 via four springs 13. The four springs 13 support the objective lens holder 12 in such a manner that the objective lens holder 12 is movable in the focusing direction and the tracking direction. To the objective lens holder 12, a focusing coil 14 and a tracking coil 15 are attached as well as the objective lens 11. The focusing coil 14, the tracking coil 15, and a pair of magnets 23 are included in an actuator for moving the objective lens holder 12 in the focusing direction and the tracking direction. The magnets 23 are attached to a yoke 21 which is fixed to the carriage 31. The magnets 23 and the yoke 21 are included in a magnetic circuit 26.

The objective lens driving apparatus 100 having the above-described structure operates in the following manner.

While the data is recorded on the optical disc or the data is reproduced from the optical disc, appropriate focusing servo control and tracking servo control are performed on the actuator. The carriage 31 moves in the tracking direction by a guiding mechanism and a driving mechanism (not shown), for example, a chassis or a spindle motor.

When a driving current flows through the focusing coil 14, driving forces F1 and F2 (FIG. 14) are generated and act on the focusing coil 14 and the magnetic circuit 26, respectively. The driving forces F1 and F2 have the same magnitude and act in opposite directions from each other. The driving force F1 moves the objective lens holder 12 in the focusing direction and is conveyed to the carriage 31 via the springs 13, thereby, vibrating the carriage 31. The driving force F2 vibrates the yoke 21 of the magnetic circuit 26 and the carriage 31 on which the yoke 21 is fixed.

The vibration of the carriage 31 caused by the driving forces F1 and F2 is conveyed to the optical disc through the guiding mechanism and the driving mechanism. If such a path for conveying the vibration has a specific resonance point, focusing servo control is impossible. Such a problem, which occurs more easily and more frequently today when less rigid components are used in the optical disc drives in order to reduce the size and weight of the drives, is a barrier against further reduction in the size and weight of the drives.

Japanese Laid-Open Patent Publication No. 4-32035 proposes, as one of the solutions of such a problem, insertion of a visco-elastic body such as rubber or a spring into the conveying path of the vibration in order to damp the vibration. Such a method has problems in that, for example, positioning precision of the components of the objective lens driving apparatus is lowered. Especially the method, described in the above-mentioned publication, of visco-elastically supporting the magnetic circuit by rubber or a cantilever spring tends to present problems in that sufficient damping is not obtained, and in that the magnetic circuit is inclined by the movement of the objective lens holder and thus contacts the coil.

Japanese Laid-Open Patent Publication No. 4-245033 proposes provision of a device for generating a vibration having the same magnitude with and the opposite phase to the vibration generated by the movement of the objective lens holder in order to counteract the vibration. Provision of such a device increases the number of the components and the size of the apparatus.

SUMMARY OF THE INVENTION

One aspect of the present invention relates to an objective lens driving apparatus including a base; an objective lens for converging an optical beam on an optical disc while the optical disc is rotating; a holding member for holding the objective lens; a first supporting mechanism for elastically supporting the holding member on the base in such a manner as to allow the holding member to be translated in a focusing direction which is substantially perpendicular to a surface of the optical disc and in a tracking direction which is substantially perpendicular to the focusing direction and parallel to a radial direction of the optical disc; a moving mechanism including a coil and a magnetic circuit for translating the holding member in the focusing direction and the tracking direction by a driving force generated by the coil and the magnetic circuit; and a second supporting mechanism for visco-elastically supporting the magnetic circuit on the base in such a manner as to translate the magnetic circuit in the focusing direction. The magnetic circuit is translated in an opposite direction to the translation direction of the holding member by a driving force acting oppositely to the driving force for translating the holding member in the focusing direction.

Another aspect of the present invention relates to an objective lens driving apparatus including a base; an objective lens for converging an optical beam on an optical disc while the optical disc is rotating; a holding member for holding the objective lens; a first supporting mechanism for elastically supporting the holding member on the base in such a manner as to allow the holding member to be translated in a focusing direction which is substantially perpendicular to a surface of the optical disc and in a tracking direction which is substantially perpendicular to the focusing direction and parallel to a radial direction of the optical disc; a moving mechanism including a coil and a magnetic circuit for translating the holding member in the focusing direction and the tracking direction by a driving force generated by the coil and the magnetic circuit; and a second supporting mechanism for visco-elastically supporting the magnetic circuit on the base in such a manner as to vibrate the magnetic circuit in the focusing direction at the lowest resonance frequency thereof. The magnetic circuit is translated in an opposite direction to the translation direction of the holding member by a driving force acting oppositely to the driving force for translating the holding member in the focusing direction.

Thus, the invention described herein makes possible an advantage of providing an objective lens driving apparatus in which vibration generated by the movement of an objective lens holder in the focusing direction and the tracking direction can be effectively restricted without causing a magnetic circuit to contact a coil, or without increasing the number of components or the size of the objective lens driving apparatus.

This and other advantages of the present invention will become apparent to those skilled in the art upon reading and understanding the following detailed description with reference to the accompanying figures.

The present invention will become more fully understood from the detailed description given hereinbelow and the accompanying drawing which are given by way of illustration only, and thus are not limitative of the present invention, and wherein:

BRIEF DESCRIPTION OF THE DRAWINGS

FIG. 14 is a side view of the conventional objective lens driving apparatus shown in FIG. 13.

DESCRIPTION OF THE PREFERRED EMBODIMENTS

Hereinafter, the present invention will be described by way of illustrative examples with reference to the accompanying drawings.

(EXAMPLE 1)

Figure 1:
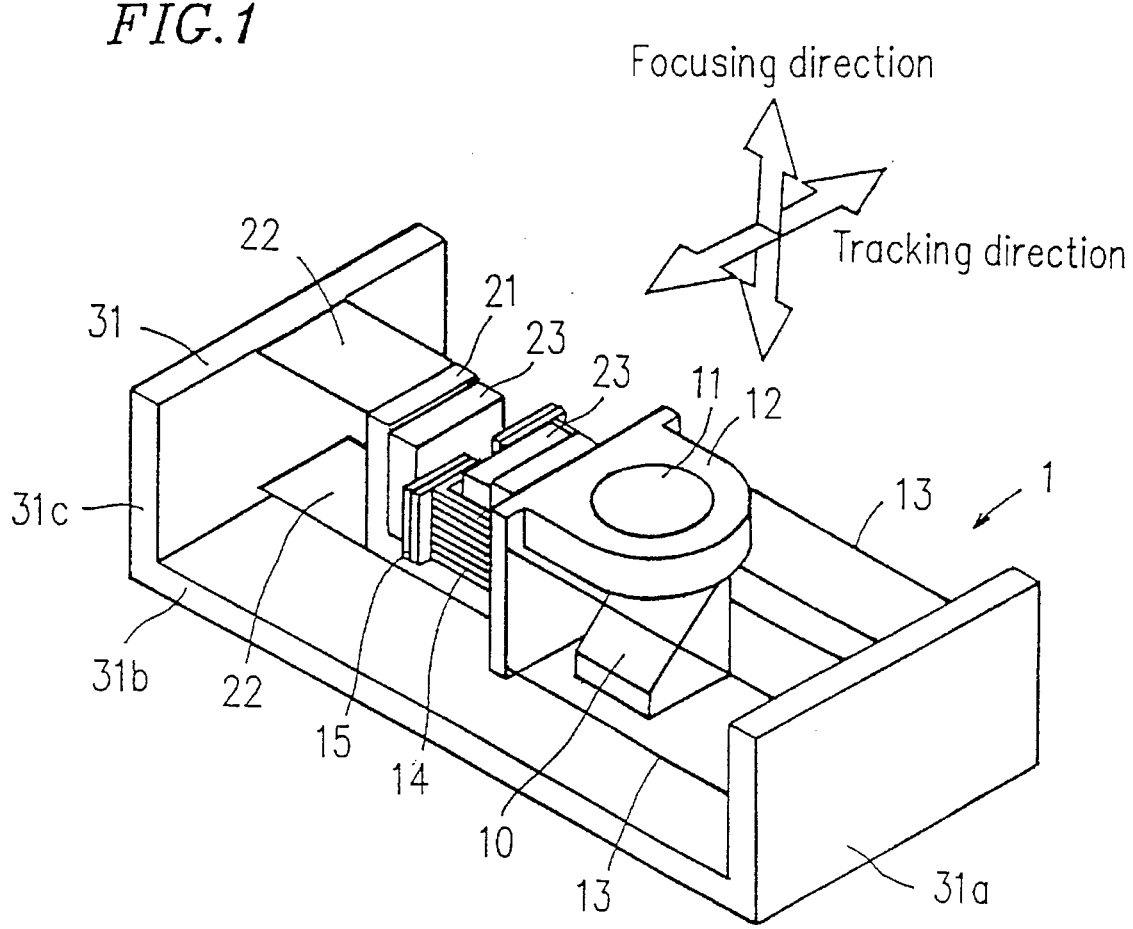
FIG. 1 is a perspective view of an objective lens driving apparatus in a first exemplary embodiment of the present invention.
Figure 2:
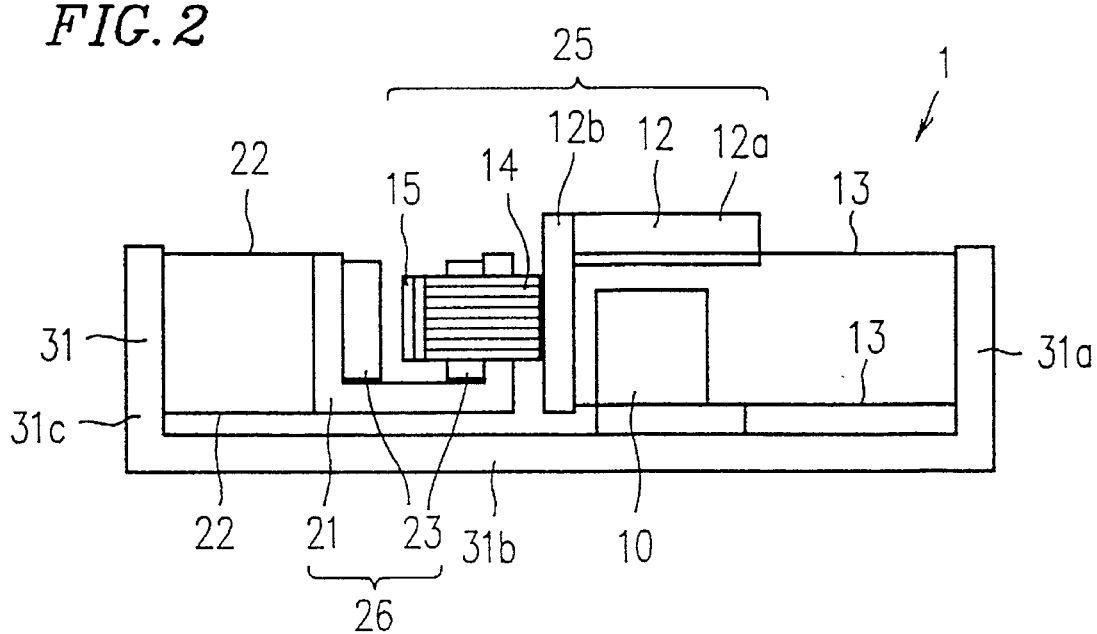
FIG. 2 is a side view of the objective lens driving apparatus shown in FIG. 1.

With reference to FIGS. 1 and 2, an objective lens driving apparatus 1 in a first exemplary embodiment of the present invention will be described. FIG. 1 is a perspective view of the objective lens driving apparatus 1, and FIG. 2 is a side view of the objective lens driving apparatus 1.

As is illustrated in FIGS. 1 and 2, an objective lens 11 is supported by an objective lens holder 12 in a state where the optical axis thereof is perpendicular to a surface of an optical disc (not shown). In such a state, the objective lens 11 converges an optical beam onto the optical disc. The objective lens holder 12 is attached to a carriage 31 acting as a base via four springs 13 acting as first supporting means each formed of an elastic wire. The four springs 13 allow the objective lens holder 12 to move mainly in the focusing direction and the tracking direction. The carriage 31 includes a horizontal portion 31b and vertical portions 31a and 31c each extended perpendicularly from the respective ends of the horizontal portion 31b. Thus, the carriage 31 has a substantially C-shaped vertical cross section. The four springs 13 are each fixed at both ends thereof to the surface of the vertical portion 31a opposed to the vertical portion 31c and a vertical portion 12b (FIG. 2) of the objective lens holder 12. A mirror 10 for guiding the optical beam emitted from an optical source (not shown) to be incident on the objective lens 11 is located on the horizontal portion 31b.

As is shown in FIG. 2, the objective lens holder 12 includes a lens retaining portion 12a in which the objective lens 12 is fixed and the vertical portion 12b. A focusing coil 14 is fixed on a surface of the vertical portion 12b opposed to the vertical portion 31c, and a tracking coil 15 is fixed on the focusing coil 14. The focusing coil 14, the tracking coil 15 and the objective lens holder 12 are included in a movable section 25. The focusing coil 14, the tracking coil 15 and a magnetic circuit 26 are included in an actuator for moving the objective lens holder 12 in the focusing direction and the tracking direction.

The magnetic circuit 26 includes a pair of magnets 23 located so as to interpose the tracking coil 15 and also includes a yoke 21 on which the magnets 23 are fixed. One of the magnets 23 is inserted into the focusing coil 14. The yoke 21 is visco-elastically supported on the carriage 31 by a pair of leaf springs 22 acting as second supporting means.

The leaf springs 22 are fixed at both ends thereof to the vertical portion 31c and the yoke 21 in the state where main surfaces thereof are horizontal and parallel to each other in the focusing direction. The leaf springs 22 are attached to a top end and a bottom end of the yoke 21, respectively. Preferably, the leaf springs 22 are attached to the magnetic circuit 26 in such a manner that the supporting center of the leaf springs 22 corresponds with the center of gravity of the magnetic circuit 26. The leaf springs 22 have substantially the same elastic constant.

The objective lens driving apparatus 1 having the above-described structure operates in the following manner.

When a driving current flows through the focusing coil 14, a driving force F1 acting in the focusing direction is generated. The driving force F1 translates the objective lens holder 12 in the focusing direction. Simultaneously, a driving force F2 equal in magnitude with and opposite in acting direction to the driving force F1 is generated. The driving force F2 translates the magnetic circuit 26 in the opposite direction to the translation direction of the objective lens holder 12 without pivoting the magnetic circuit 26 toward the vertical portion 31c. The pivoting movement of the magnetic circuit 26 is substantially prohibited by the leaf springs 22 arranged parallel to each other in the focusing direction.

The translation of the magnetic circuit 26 in the opposite direction to the translation direction of the objective lens holder 12 counteracts to the vibration generated by the movement of the objective lens holder 12 in the focusing direction. Accordingly, the vibration caused by the movement of the objective lens holder 12 in the focusing direction can be significantly reduced. As a result, a stable focusing servo control can be realized.

Further, as is described above, the leaf springs 22 are arranged parallel to each other in the focusing direction. As a result, the magnetic circuit 26 is substantially prohibited from pivoting toward the vertical portion 31c while being translated oppositely to the objective lens holder 12 in the focusing direction. For this reason, the yoke 21 and the magnets 23 are kept out of contact with the focusing coil 14 and the tracking coil 15. Accordingly, the distance between the magnetic circuit 26 and each of the coils 14 and 15 can be set at a minimum possible distance. Such a short distance is advantageous in reducing the total size of the objective lens driving apparatus 1.

The leaf springs 22 are formed of, for example, phosphorus bronze, beryllium bronze, or stainless steel. Phosphorus bronze is less expensive than the other materials. Beryllium bronze and stainless steel are high in resistance against wearing and corrosion, respectively. The leaf springs 22 formed of one of the above-mentioned materials are strong against deformation during assembly of the objective lens driving apparatus 1, and the characteristics thereof are not changed much in accordance with the temperature.

As is described above, the leaf springs 22 are preferably located in such a position that the supporting center of the leaf springs 22 corresponds with the center of gravity of the magnetic circuit 26. Even if the supporting center of the leaf springs 22 is offset from the center of gravity of the magnetic circuit 26, the vibration conveyed to the carriage 31 for the lack of counteraction due to such positional offset presents no problem as long as the vibration is too small to cause any trouble in performing focusing servo control.

In the first example, a pair of leaf springs 22 are provided for visco-elastically supporting the magnetic circuit 26 in the state where the main surfaces thereof are arranged parallel to each other in the focusing direction. In such a structure, since the leaf springs 22 are highly rigid against deformation in all directions except for the direction perpendicular to the main surfaces thereof, namely, the focusing direction, the leaf springs 22 are untwisted even when exposed to the driving force F2. In other words, the magnetic circuit 26 vibrates at the lowest resonance frequency thereof in the focusing direction. Thus, the magnetic circuit 26 is not inclined in any direction. Accordingly, the magnetic circuit 26 is kept out of contact with the coils 14 and 15, which allows the distance between the magnetic circuit 26 and each of the coils 14 and 15 to be set at a minimum possible distance. This is advantageous in reducing the total size of the objective lens driving apparatus 1.

(EXAMPLE 2)

Figure 3:
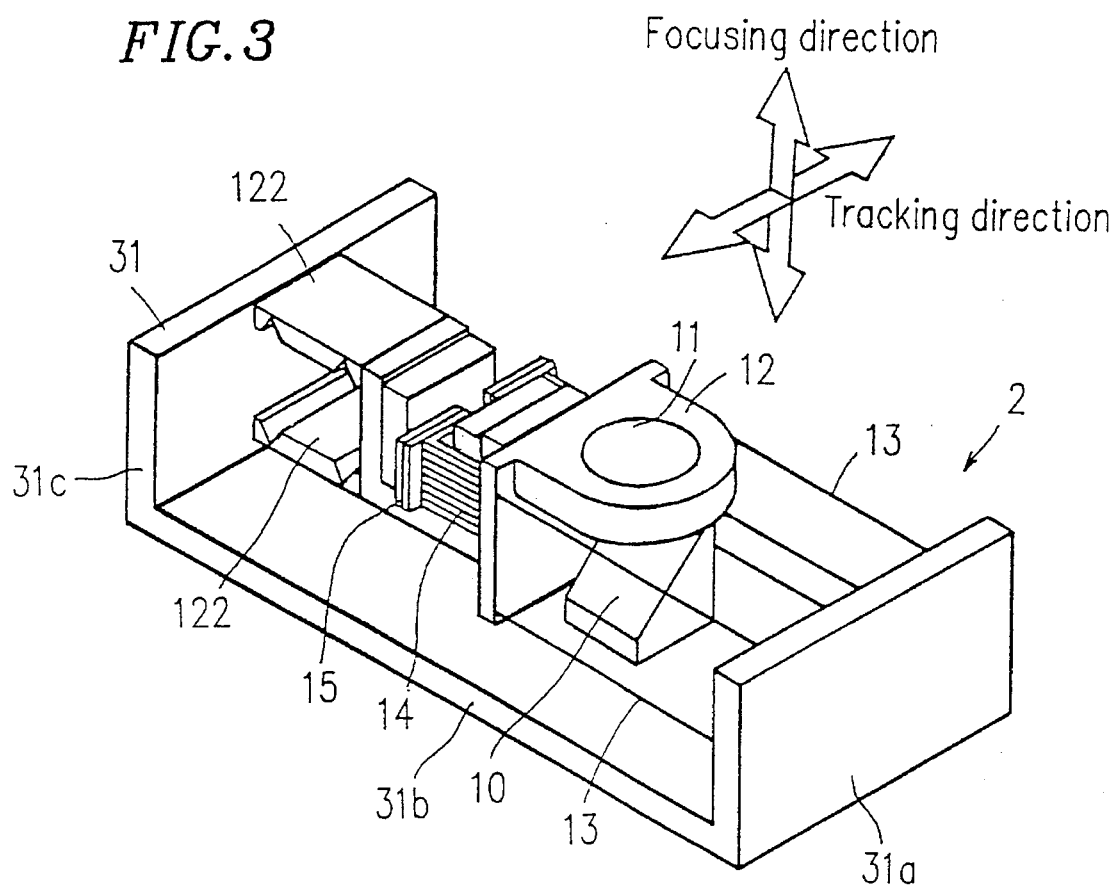
FIG. 3 is a perspective view of an objective lens driving apparatus in a second exemplary embodiment of the present invention.

With reference to FIG. 3, an objective lens driving apparatus 2 in a second exemplary embodiment of the present invention will be described. FIG. 3 is a perspective view of the objective lens driving apparatus 2. Identical elements with those in the first example will bear identical reference numerals therewith, and explanation thereof will be omitted.

In the second example, a pair of hinges 122 are provided for visco-elastically supporting the magnetic circuit 26 instead of the pair of leaf springs 22. The hinges 122 are each a plate having two V-shaped grooves on a main surface thereof. The hinges 122 are attached to the vertical portion 31c in the state where the surfaces thereof having the V-grooves are horizontal and parallel to each other one above the other. Further, the surfaces of the hinges 122 having the V-shaped grooves are opposed to each other. Since the hinges 122 function in the same way as the leaf springs 22, the objective lens driving apparatus 2 operates in the same manner as the objective lens driving apparatus 1. Thus, the vibration caused by the movement of the objective lens holder 12 in the focusing direction is significantly reduced by counteraction.

As is described above, the surfaces of the hinges 122 having the V-shaped grooves are arranged parallel to each other one above the other. By such arrangement, the reaction force of the hinges 122 is generated in the focusing direction. Accordingly, the magnetic circuit 26 is prohibited from pivoting toward the vertical portion 31c while being translated oppositely to the objective lens holder 12. For this reason, the yoke 21 and the magnets 23 are kept out of contact with the focusing coil 14 and the tracking coil 15. This allows the distance between the magnetic circuit 26 and each of the coils 14 and 15 to be set at a minimum possible-distance. As a result, the objective lens driving apparatus 2 can be reduced in size, while greatly reducing the vibration of the carriage 31 caused by the movement of the objective lens holder 12 in the focusing direction.

The hinges 122 are formed of, for example, a resin such as thermoplastic polyester elastomer, which is high in resistance against wearing. The hinges 122 formed of a resin, which can be produced by molding, are easy to mass-produce. The hinges 122 formed of a resin can be molded integrally with the vertical portion 31c or a member for attaching the hinges 122 to the yoke 21. Since there is little possibility that the hinges 122 formed of a resin might be deformed during the assembly, the assembly of the objective lens driving apparatus 2 can be performed more easily and at a higher yield.

As in the first example, the hinges 122 are preferably located in such a manner that the supporting center of the hinges 122 corresponds with the center of gravity of the magnetic circuit 26. Such correspondence is not absolutely necessary as long as the vibration conveyed to the carriage 31 for the lack of counteraction due to such positional offset is too small to cause any trouble in performing focusing servo control.

In the second example, a pair of hinges 122 are provided for visco-elastically supporting the magnetic circuit 26 in the state where the surfaces thereof having the V-shape grooves are parallel to each other one above the other. In such a structure, since the hinges 122 are highly rigid against deformation in all directions except for the direction perpendicular to the surfaces thereof having the V-shaped grooves, namely, the focusing direction, the hinges 122 are untwisted even when exposed to the driving force F2. In other words, the magnetic circuit 26 vibrates at the lowest resonance frequency thereof in the focusing direction. Thus, the magnetic circuit 26 is not inclined in any direction. Accordingly, the magnetic circuit 26 is kept out of contact with the coils 14 and 15, which allows the distance between the magnetic circuit 26 and each of the coils 14 and 15 to be set at a minimum possible distance. This is advantageous in reducing the total size of the objective lens driving apparatus 2.

(EXAMPLE 3)

Figure 4:
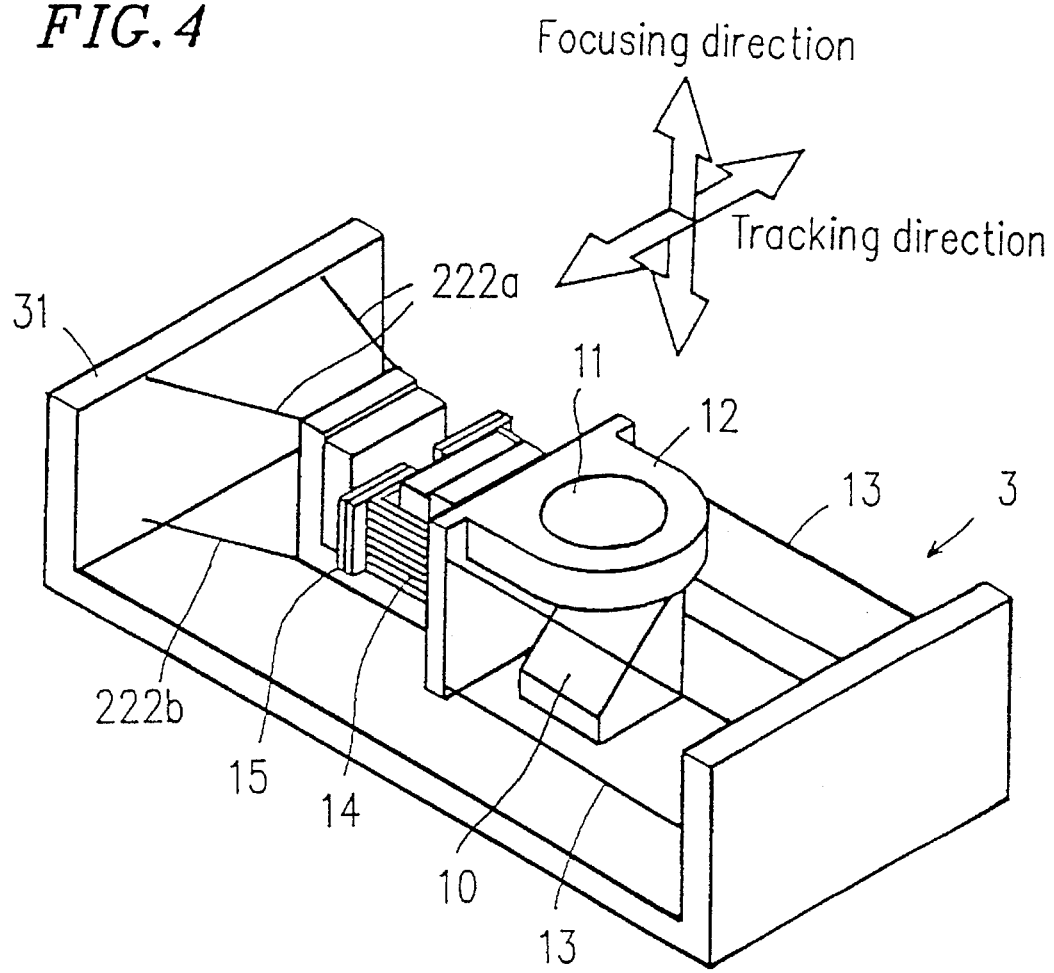
FIG. 4 is a perspective view of an objective lens driving apparatus in a third exemplary embodiment of the present invention.
Figure 5:
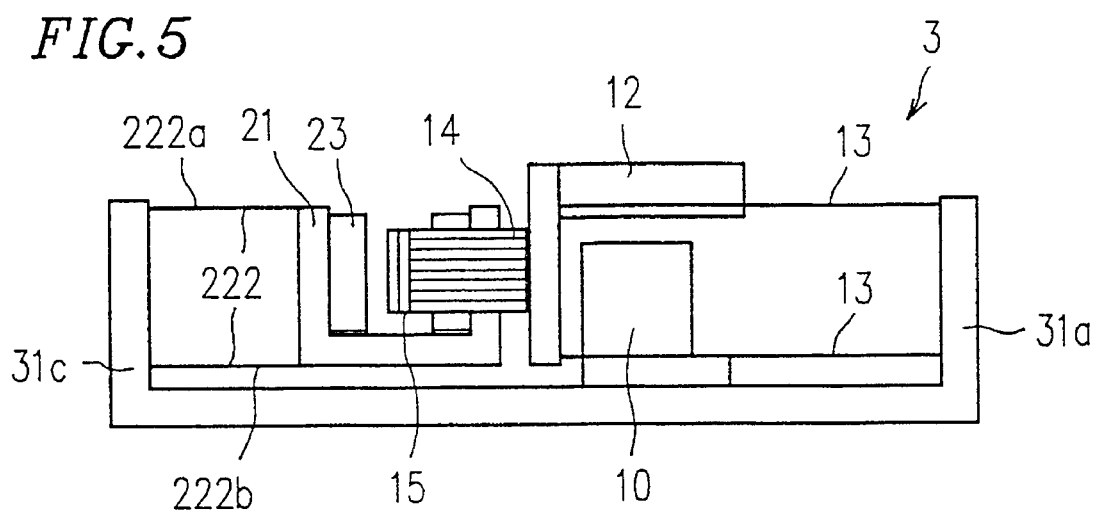
FIG. 5 is a side view of the objective lens driving apparatus shown in FIG. 4.

With reference to FIGS. 4 and 5, an objective lens driving apparatus 3 in a third exemplary embodiment of the present invention will be described. FIG. 4 is a perspective view of the objective lens driving apparatus 3, and FIG. 5 is a side view of the objective lens driving apparatus 3. Identical elements with those in the first example will bear identical reference numerals therewith, and explanation thereof will be omitted.

In the third example, two pairs of elastic wires 222a and 222b are provided for visco-elastically supporting the magnetic circuit 26. The upper pair of wires 222a are attached to top corners of the yoke 21, and the lower pair of wires 222b (only one wire is shown in FIG. 4) are attached to the bottom corners of the yoke 21. All the four wires 222a and 222b are horizontal. The distance between the wires 222a and the distance between the wires 222b are each expanded from the yoke 21 toward the vertical portion 31c of the carriage 31. Since the pairs of wires 222a and 222b function in the same manner as the leaf springs 22, the objective lens driving apparatus 3 operates in the same way as the objective lens driving apparatus 1. Thus, the vibration caused by the movement of the objective lens holder 12 in the focusing direction is significantly reduced by counteraction.

As is appreciated from FIGS. 4 and 5, the elastic wires 222a and 222b are located in such a manner that the reaction force of the elastic wires 222a and 222b is generated in the focusing direction. Accordingly, the magnetic circuit 26 is substantially prohibited from pivoting toward the vertical portion 31c while being translated oppositely to the objective lens holder 12 in the focusing direction. For this reason, the yoke 21 and the magnets 23 are kept out of contact with the focusing coil 14 and the tracking coil 15. This allows the distance between the magnetic circuit 26 and each of the coils 14 and 15 to be set at a minimum possible distance. As a result, the objective lens driving apparatus 3 can be reduced in size.

The elastic wires 222a and 222b are preferably formed of, for example, phosphorus bronze, beryllium bronze, or stainless steel. By using one of such materials, the magnetic circuit can be easily designed to vibrate in the focusing direction at a lower resonance frequency. The elastic wires 222a and 222b formed of one of such materials are advantageous in being less influenced by temperature as well as in effectively absorbing the vibration.

In the third example, two pairs of elastic wires 222a and 222b are provided for visco-elastically supporting the magnetic circuit 26. In such a structure, the assembly of the elastic wires 222a and 222b is highly rigid against deformation in all directions except for the direction perpendicular to a plane defined by the elastic wires 222a and a plane defined by the elastic wires 222b. Namely, the assembly of the elastic wires 222a and 222b is highly rigid against deformation in all directions except for the focusing direction. In other words, the magnetic circuit 26 vibrates at the lowest resonance frequency thereof in the focusing direction. Accordingly, the magnetic circuit 26 is not inclined in any direction. Thus, the magnetic circuit 26 is kept out of contact with the coils 14 and 15, which allows the distance between the magnetic circuit 26 and each of the coils 14 end 15 to be set at a minimum possible distance. As a result, the total size of the objective lens driving apparatus 3 can be reduced.

(EXAMPLE 4)

Figure 6:
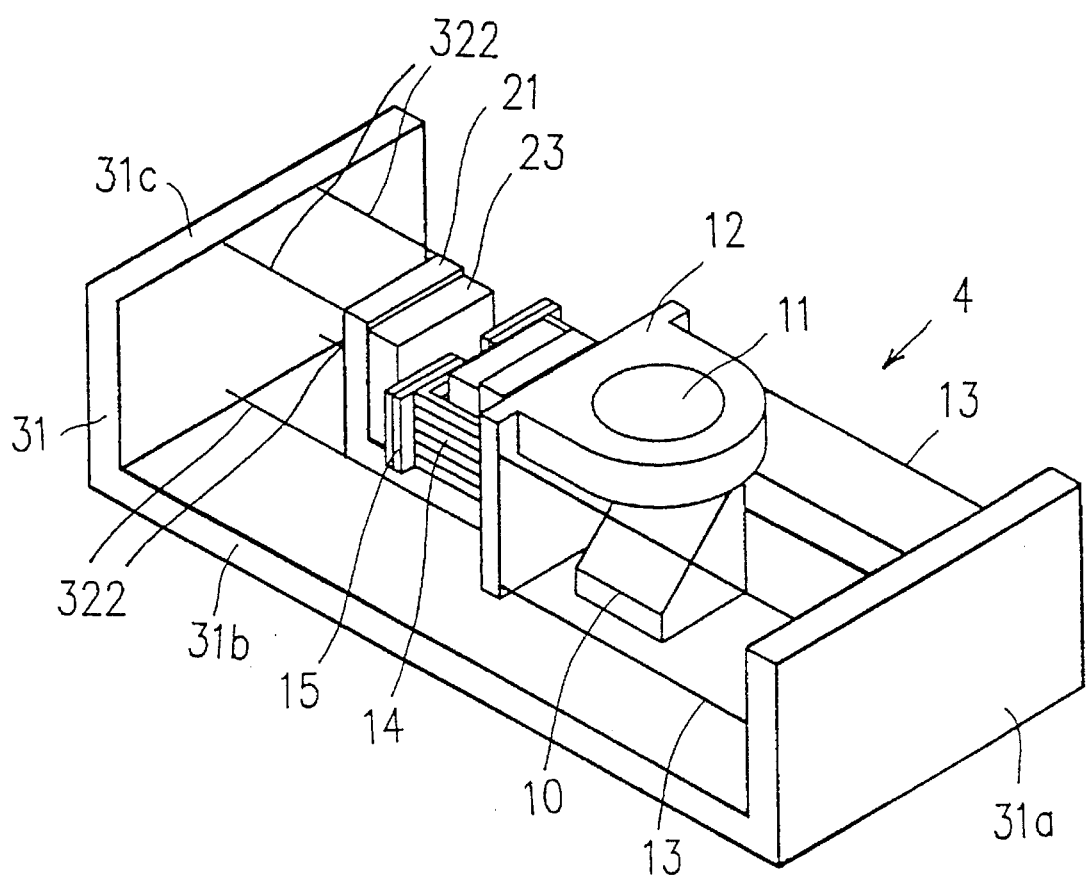
FIG. 6 is a perspective view of an objective lens driving apparatus in a fourth exemplary embodiment of the present invention.

With reference to FIG. 6, an objective lens driving apparatus 4 in a fourth exemplary embodiment of the present invention will be described. FIG. 6 is a perspective view of the objective lens driving apparatus 4. Identical elements with those in the first example will bear identical reference numerals therewith, and explanation thereof will be omitted.

In the fourth example, two pairs of elastic wires 322 for visco-elastically supporting the magnetic circuit 26 are provided parallel to one another. Due to such a structure, the magnetic circuit 26 is translated in the tracking direction as well as in the focusing direction with no pivoting movement. Accordingly, the vibration caused by the movement of the objective lens holder 12 in the focusing direction and also the vibration caused by the movement of the objective lens holder 12 in the tracking direction can be counteracted by the vibration of the magnetic circuit 26, thereby significantly reducing both types of vibration.

The elastic wires 322 are preferably formed of, for example, phosphorus bronze, beryllium bronze, or stainless steel. By using one of such materials, the magnetic circuit can be easily designed to vibrate in the focusing direction at a lower resonance frequency. The elastic wires 322 formed of one of such materials are advantageous in being less influenced by temperature as well as in effectively absorbing the vibration.

In the fourth example, the effects obtained in the third example can also be obtained. (EXAMPLE 5)

Figure 7:
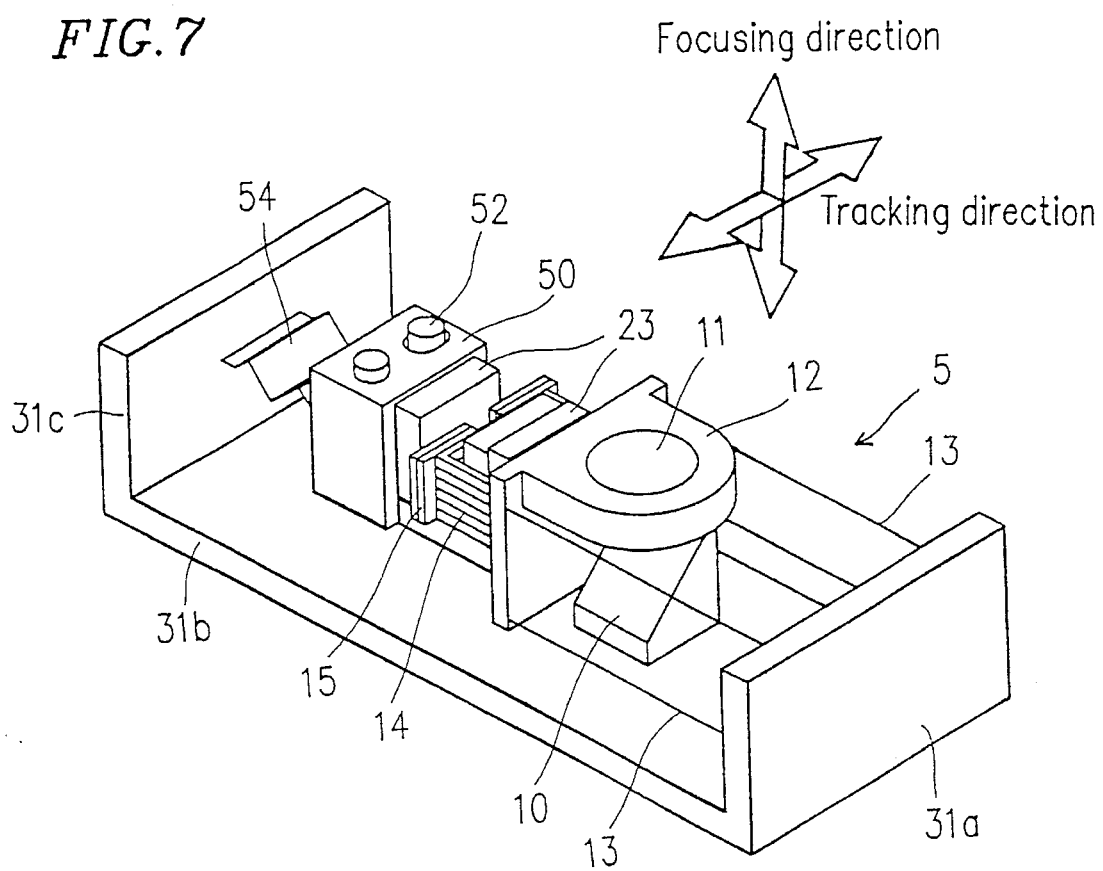
FIG. 7 is a perspective view of an objective lens driving apparatus in a fifth exemplary embodiment of the present invention.
Figure 8:
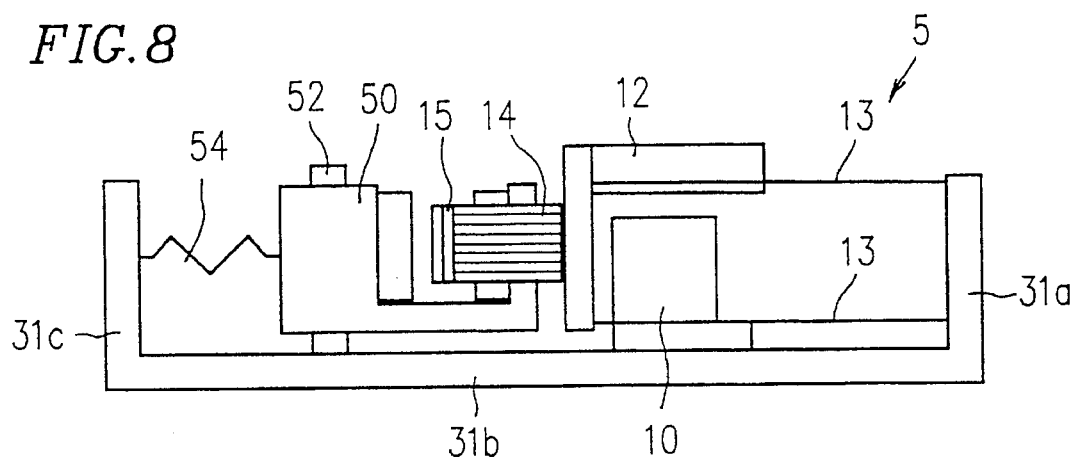
FIG. 8 is a side view of the objective lens driving apparatus shown in FIG. 7.

With reference to FIGS. 7 and 8, an objective lens driving apparatus 5 in a fifth exemplary embodiment present invention will be described. FIG. 7 is a perspective view of the objective lens driving apparatus 5, and FIG. 8 is a side view of the objective lens driving apparatus 5. Identical elements with those in the first example will bear identical reference numerals therewith, and explanation thereof will be omitted.

In the fifth example, as is shown in FIGS. 7 and 8, a leaf spring 54 fixed to the vertical portion 31c of the carriage 31 visco-elastically supports the magnetic circuit 26 via a slidable member 50, instead of directly supporting the yoke 21 of the magnetic circuit 26. The slidable member 50 is attached to the yoke 21 on the other side from the coils 14 and 15. The leaf spring 54 has a sawtooth-like cross section. The slidable member 50 has two holes through which a pair of guide posts 52 are extended vertically with respect to the horizontal portion 31b, namely, substantially in the focusing direction. The leaf spring 54 visco-elastically supports the slidable member 50 so as to allow the slidable member 50 to slide in the direction in which the guide posts 52 are extended.

By providing the slidable member 50 and the guide posts 52 in the above-described manner, the magnetic circuit 26 is movable only in the direction parallel to the extending direction of the guide posts 52, namely, in the focusing direction. Accordingly, it is not necessary to locate the leaf spring 54 in such a manner as to prohibit the pivoting movement of the magnetic circuit 26 toward the vertical portion 31c. The leaf spring 54 may be replaced with a flat leaf spring as used in the first example or a hinge as used in the second example. However, it is not necessary to provide a pair of leaf springs or a pair of hinges. In the case that elastic wires are provided as in the third example instead of the leaf spring 54, it is sufficient to provide only a pair of wires at the same height from the horizontal portion 31b instead of two pairs of wires.

The shape of the leaf spring 54 is not limited to the one shown in FIGS. 7 and 8. The leaf spring 54 may have any shape as long as an elastic force for moving the slidable member 50 in the focusing direction is generated.

In the fifth example also, the magnetic circuit 26 vibrates at the lowest resonance frequency thereof in the focusing direction. Since the pivoting movement of the magnetic circuit 26 is substantially prohibited by the combination of the slidable member 50 and the guide posts 52, the magnet 23 and the yoke 21 of the magnetic circuit 26 are kept out of contact with the focusing coil 14 and the tracking coil 15.

(EXAMPLE 6)

Figure 9:
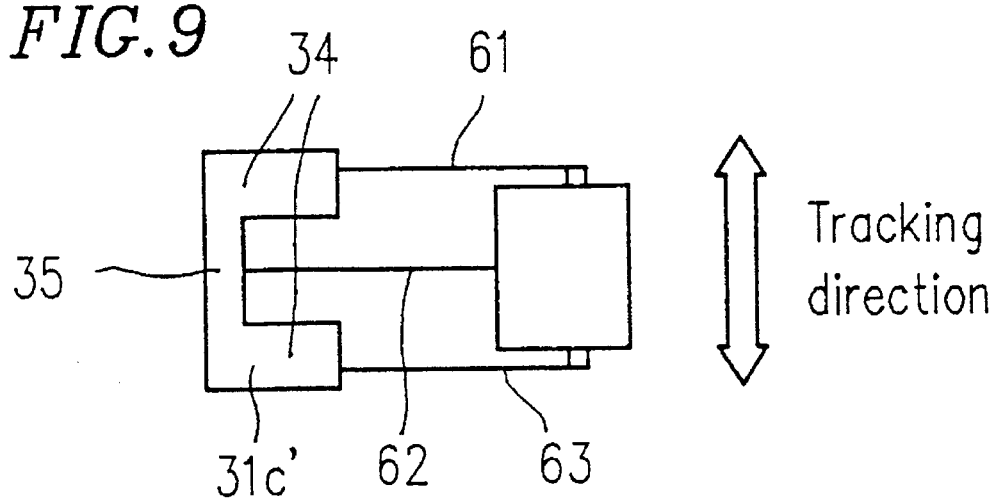
FIG. 9 is a partial top view of an objective lens driving apparatus in a sixth exemplary embodiment of the present invention.

With reference to FIG. 9, an objective lens driving apparatus 6 in a sixth exemplary embodiment the present invention will be described. FIG. 9 is a partial top view of the objective lens driving apparatus 6.

As is shown in FIG. 9, the magnetic circuit 26 is viscoelastically supported by three elastic wires 61, 62 and 63. The elastic wires 61, 62 and 63 have an identical length and are located at the same height from the horizontal portion 31b of the carriage 31. A vertical portion 31c" of the carriage 31 has a substantially C-shaped horizontal cross section including two extended portions 34 and a central portion 35. Ends of the wires 61 and 63 are attached to ends of the extended portions 34, respectively. An end of the wire 62 is attached to the central portion 35. The other end of the wire 62 is attached to a surface of the yoke 21 opposed to the vertical portion 31c'. The other ends of the wires 61 and 63 are respectively attached to attaching members which are located on side surfaces of the yoke 21 extended perpendicular to the tracking direction. In such a structure, the same effects as in the previous five examples can be obtained.

(EXAMPLE 7)

Figure 10:
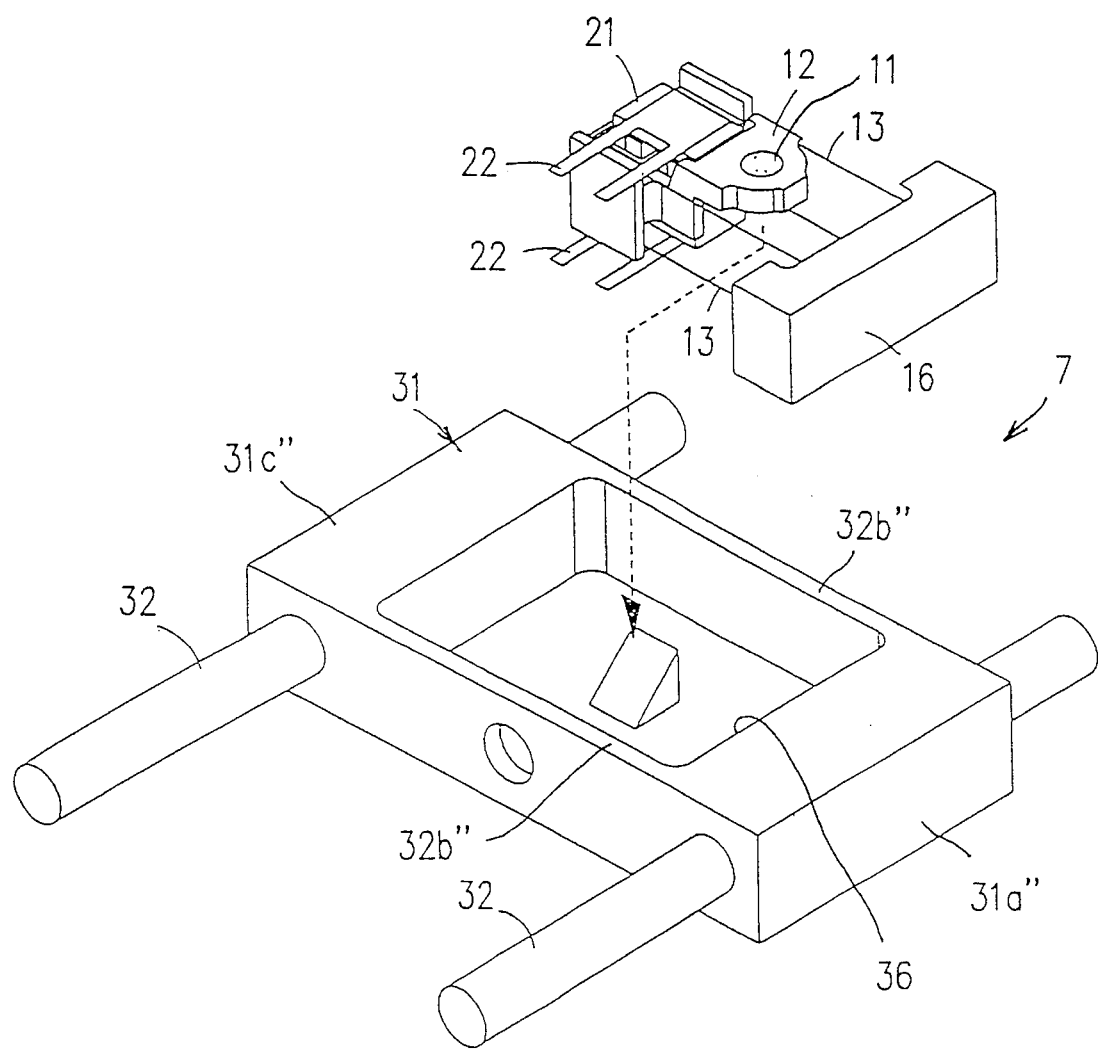
FIG. 10 is an exploded perspective view of an objective lens driving apparatus in a seventh to the present invention.

With reference to FIG. 10, an objective lens driving apparatus 7 in a seventh exemplary embodiment of the present invention will be described. FIG. 10 is an exploded perspective view of the objective lens driving apparatus 7.

In the seventh example, the carriage 31 has a receptacle portion 36 surrounded by side portions 31c" and 31a" and connecting portions 32b". The side portions 31c" and 31a" respectively correspond to the vertical portions 31c and 31a in the first through fifth examples. The magnetic circuit including the yoke 21 and a pair of magnets (not shown) fixed to the yoke 21 is attached to one of the connecting portions 32b".

As is illustrated in FIG. 10, the objective lens holder 12 for supporting the objective lens 11 is attached to a spring holder 16 by the four springs 13 in such a manner that the objective lens holder 12 can be translated in the focusing direction and the tracking direction. The spring holder 16 is accommodated in the receptacle portion 36 of the carriage 31 together with the objective lens holder 12, a focusing coil and a tracking coil (neither is shown) both fixed on the objective lens holder 12, and the like.

The yoke 21 is supported in a receptacle portion 36 of the carriage 31 by two leaf springs 22 arranged parallel to each other in the focusing direction and perpendicular to the springs 13. The magnetic circuit, the focusing coil and the tracking coil are included in an actuator for translating the objective lens holder 12 in the focusing direction and the tracking direction. The leaf springs 22 are located in the same manner as in the first example except being attached to the connecting portion 32b". Accordingly, the magnetic circuit 26 vibrates in the focusing direction at the lowest resonance frequency thereof.

The carriage 31 is attached to a mounting plate (not shown) via a pair of guide shafts 32 extended in the tracking direction. The mounting plate includes a spindle motor for rotating the optical disc and is attached to a chassis of the objective lens driving apparatus 7 via a damping material.

Figure 11:
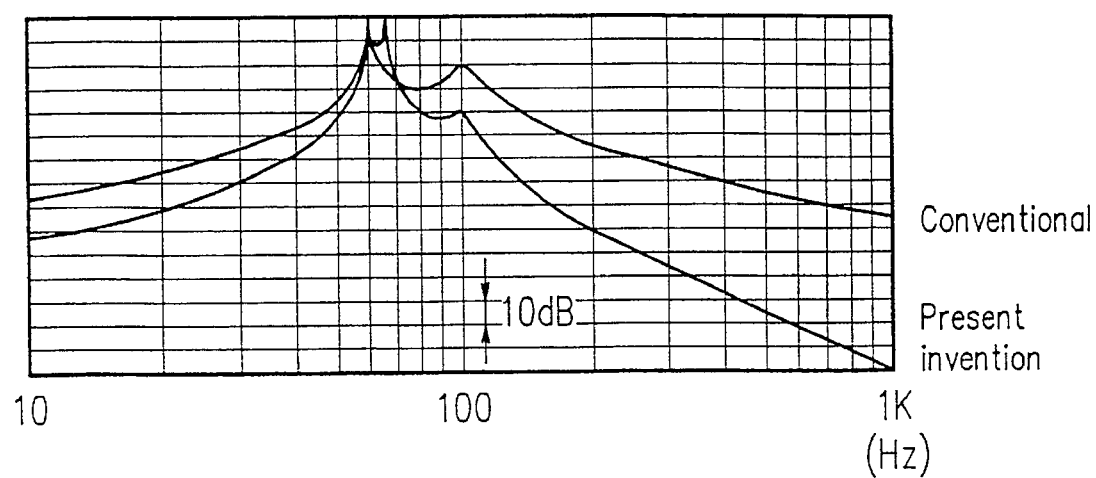
FIGS. 11 and 12 are each a graph illustrating the transfer function of the vibration of a mounting plate with respect to the vibration of an objective lens holder in the objective lens driving apparatus shown in FIG. 10 and in a conventional objective lens driving apparatus.

FIG. 11 is a graph illustrating the transfer function of the vibration of the mounting plate with respect to the vibration of the objective lens holder 12 in the objective lens driving apparatus 7 in the seventh example and in a conventional objective lens driving apparatus. In the conventional objective lens driving apparatus, the magnetic circuit is attached to the carriage directly. In the objective lens driving apparatus 7, the total mass of the objective lens 11 and the objective lens holder 12 is approximately 200 mg, the mass of the magnetic circuit is approximately 500 mg, and the mass of the mounting plate is approximately 150 g. A first spring-mass system including the objective lens holder 12, the four springs 13, and the like is adjusted to have a lowest resonance frequency of vibration in the focusing direction of approximately 60 Hz, and the damping ratio is adjusted to be approximately 0.01. A second spring-mass system including the magnetic circuit and the leaf springs 22 is adjusted to have a lowest resonance frequency of vibration in the focusing direction of approximately 65 Hz, and the damping ratio is adjusted to be approximately 0.01. The mounting plate is adjusted to have a lowest resonance frequency of approximately 100 Hz and a damping ratio of approximately 0.1 by selection of an appropriate damping material.

As is appreciated from FIG. 11, the vibration of the mounting plate is less in the objective lens driving apparatus 7 than in the conventional apparatus by approximately 60 dB at a frequency of 1 kHz.

Here, the lowest resonance frequency of vibration of the second spring-mass system, namely, the lowest resonance frequency of vibration of the magnetic circuit is adjusted to be 65 Hz, which is proximate to the lowest resonance frequency of vibration (60 Hz) of the first spring-mass system in the focusing direction, namely, the lowest resonance frequency of the vibration of the movable section in the focusing direction. By setting the former proximate to the latter, the vibration caused by the movement of the movable section in the focusing direction is counteracted more effectively.

If it is difficult to set the lowest resonance frequency of vibration of the magnetic circuit proximately to the lowest resonance frequency of vibration of the movable section, the former may be set at half or less of the frequency of the vibration which is to be reduced. In this way, the vibration caused by the movement of the movable section in the focusing direction is sufficiently alleviated to prevent any trouble in performing focusing servo control.

Figure 12:
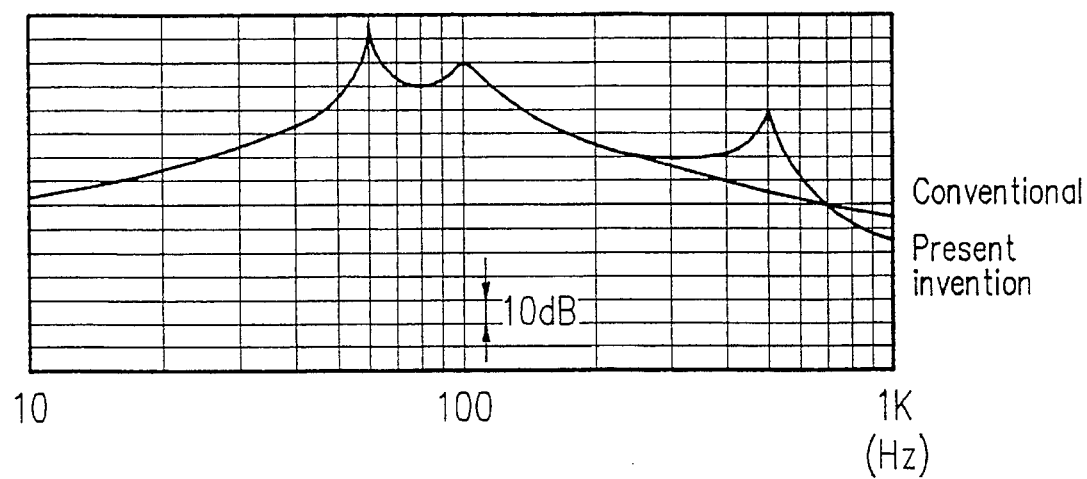
Figure 13:
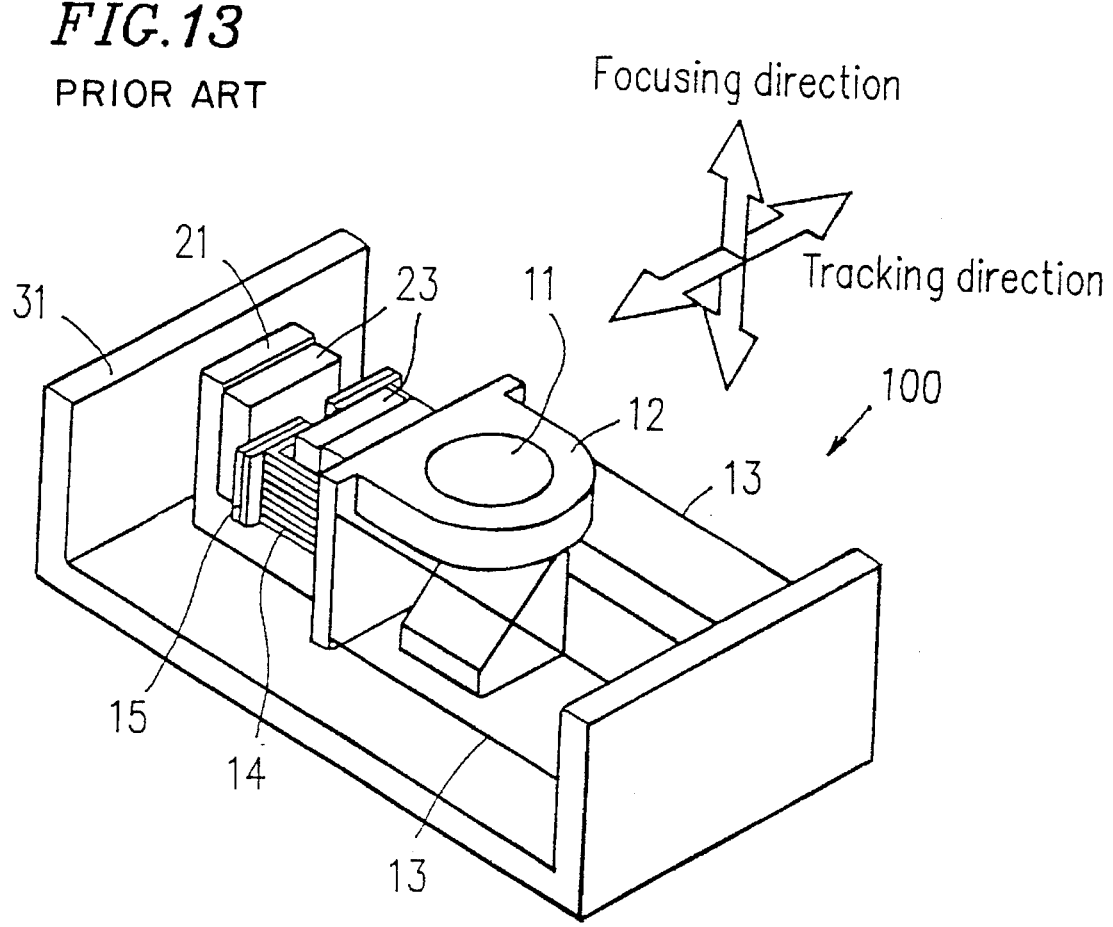
FIG. 13 is a perspective view of a conventional objective lens driving apparatus.

FIG. 12 is a graph illustrating the transfer function of the vibration of the mounting plate with respect to the vibration of the objective lens holder 12 in the objective lens driving apparatus 7 and in the conventional apparatus. In the objective lens driving apparatus 7, the lowest resonance frequency of vibration of the second spring-mass system is set at 500 Hz while the frequency of the vibration to be reduced is 1 kHz. As is appreciated from FIG. 12, the vibration of the mounting plate is less in the objective lens driving apparatus 7 than in the conventional apparatus by approximately 10 dB at the frequency of 1 kHz.

If the conveying path of the vibration has a specific resonance point in the vicinity of the resonance frequency, the lowest resonance frequency of vibration of the magnetic circuit is preferably set at a level as far as possible from the resonance point and lower than the frequency of the resonance point.

An objective lens driving apparatus according to the present invention is not limited to those described in the first through the seventh examples. For example, a plurality of magnetic circuits may be provided, in which case, each of the magnetic circuits is adjusted to vibrate at the lowest resonance frequency thereof in the focusing direction. The same effects can be obtained.

In the first through fourth, sixth and seventh exemplary embodiments, by substantially equalizing the height of members for visco-elastically supporting the magnetic circuit, such as the leaf springs 22 or the hinges 122, from the horizontal portion 31b of the carriage 31 with the height of the springs 13 for elastically supporting the objective lens holder 12 from the horizontal portion 31b, an increase in the total thickness of the objective lens driving apparatus can be avoided despite the provision of the members for visco-elastically supporting the magnetic circuit. The fifth exemplary embodiment also, by equalizing the height of the guide posts with the height of the springs 13 from the horizontal portion 31b, an increase in the total thickness of the objective lens driving apparatus can be avoided.

As has been described so far, an objective lens driving apparatus according to the present invention includes a mechanism for visco-elastically supporting the magnetic circuit in such a manner as to vibrate the magnetic circuit at substantially the lowest resonance frequency thereof in the focusing direction. Such a mechanism supports the magnetic circuit so as to allow the magnetic circuit to be translated in the focusing direction without pivoting. Due to such a structure, when the objective lens holder moves in the focusing direction, the magnetic circuit is translated oppositely to the objective lens holder. Thus, the vibration caused by the movement of the objective lens holder in the focusing direction can be counteracted. As a result, problems such as the impossibility of focusing servo control is prevented, which realizes stable focusing servo control.

According to the present invention, since an apparatus for counteracting the vibration as required in conventional apparatuses is eliminated, the number of components can be reduced and the total size of the driving apparatus can be decreased.

Since the pivoting movement of the magnetic circuit is substantially prohibited by the mechanism for visco-elastically supporting the magnetic circuit, the magnetic circuit can be kept out of contact with the focusing coil and the tracking coil when the magnetic circuit moves in the focusing direction. Such an advantage allows the distance between the magnetic circuit and the coils to be set at a minimum possible distance, which reduces the total size of the objective lens driving apparatus.

By locating the mechanism for visco-elastically supporting the magnetic circuit at substantially the same height as the height at which the member for supporting the objective lens holder is located, an increase in the total thickness of the objective lens driving apparatus can be avoided.

By substantially equalizing the lowest resonance frequency of vibration of the magnetic circuit, namely, the resonance frequency of vibration of the magnetic circuit in the focusing direction to the resonance frequency of vibration of the movable section including the objective lens holder in the focusing direction, the undesirable vibration caused by the movement of the objective lens holder in the focusing direction can be counteracted and reduced more effectively. Even if the above two resonance frequencies cannot be substantially the same, the undesirable vibration can still be alleviated by setting the lowest resonance frequency of vibration of the magnetic circuit at ½ or less of the frequency of vibration which is to be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An objective lens driving apparatus comprising:

a base;

an objective lens for converging an optical beam onto an optical disc while the optical disc is rotating;

holding means for holding said objective lens;

first supporting means for elastically supporting said holding means on said base in such a manner as to allow said holding means to be translated in a focusing direction which is substantially perpendicular to a surface of the optical disc and in a tracking direction which is substantially perpendicular to the focusing direction and parallel to a radial direction of the optical disc;

moving means including a coil and a magnetic circuit for translating said holding means in the focusing direction and the tracking direction by a driving force generated by said coil and said magnetic circuit; and second supporting means for visco-elastically supporting said magnetic circuit on said base in such a manner as to translate said magnetic circuit in the focusing direction, wherein said magnetic circuit is translated in an opposite direction to the translation direction of said holding means by a driving force acting oppositely to the driving force for translating said holding means in the focusing direction, said second supporting means including an attachment member to which said magnetic circuit is attached and which has at least one hole, at least one guide post extended through said at least one hole in a direction parallel to the focusing direction, and an elastic member for supporting said attachment member on said base, wherein said magnetic circuit is translated in the focusing direction by sliding movement of said attachment member along said at least one guide post.

* * * * *